N. S. Hazen,
Churn.

No. 103,612.  Patented May 31, 1870.

Witnesses:
Jno. H. Brooks
E. Tate

Inventor:
N. S. Hazen
Per Munn & Co.
Attorneys.

N. PETERS, PHOTO-LITHOGRAPHER, WASHINGTON, D. C.

United States Patent Office.

NATHAN S. HAZEN, OF LA FAYETTE, INDIANA.

Letters Patent No. 103,612, dated May 31, 1870.

IMPROVEMENT IN CHURNS.

The Schedule referred to in these Letters Patent and making part of the same.

*To all whom it may concern:*

Be it known that I, NATHAN S. HAZEN, of La Fayette, in the county of Tippecanoe and State of Indiana, have invented a new and useful Improvement in Churning Apparatus; and I do hereby declare that the following is a full, clear, and exact description thereof, which will enable others skilled in the art to make and use the same, reference being had to the accompanying drawing forming part of this specification, in which—

Similar letters of reference indicate corresponding parts.

My invention has for its object to furnish an improved churning apparatus which shall be simple in construction and effective in operation, doing its work quickly and thoroughly; and It consists in the construction of the dasher, and in the combination of the parts by which it is operated, as hereinafter more fully described.

A represents the platform or floor, upon which the churn B is placed.

B is an ordinary churn, which is provided with a cover, C, through which the dasher-handle D moves up and down.

The dasher-handle D is made to move up and down vertically by the arched guide $c'$, attached to the cover C, and through which the said dasher-handle D passes.

The upper end of the dasher-handle D is pivoted to the middle part of the lever E, one end of which serves as a handle for operating the dasher, and its other end is pivoted to the upper end of the connecting-rod F.

The lower end of the connecting-rod F is pivoted to the platform or floor A, or to a support attached to said platform or floor.

This construction allows the pivoted end of the lever E to change its position as said lever is operated, so that the dasher-handle D may move up and down vertically.

G is the dasher, which is securely attached to the lower end of the handle D, and which fits into the interior of the churn B.

$g^1$ are two holes formed through the dasher G upon the opposite sides of the handle D, and which are provided with valves $g^2$, upon the lower side of the dasher G, said valves opening downward, and being provided with stops, to prevent them from opening too far.

The upper surface of the dasher G, around the upper ends of the holes $g^1$, is concaved, so as to guide the milk more readily into said holes.

Through the dasher G, upon the opposite sides of the handle D, and midway between the holes $g^1$, are formed two holes, $g^3$.

Figure 1:
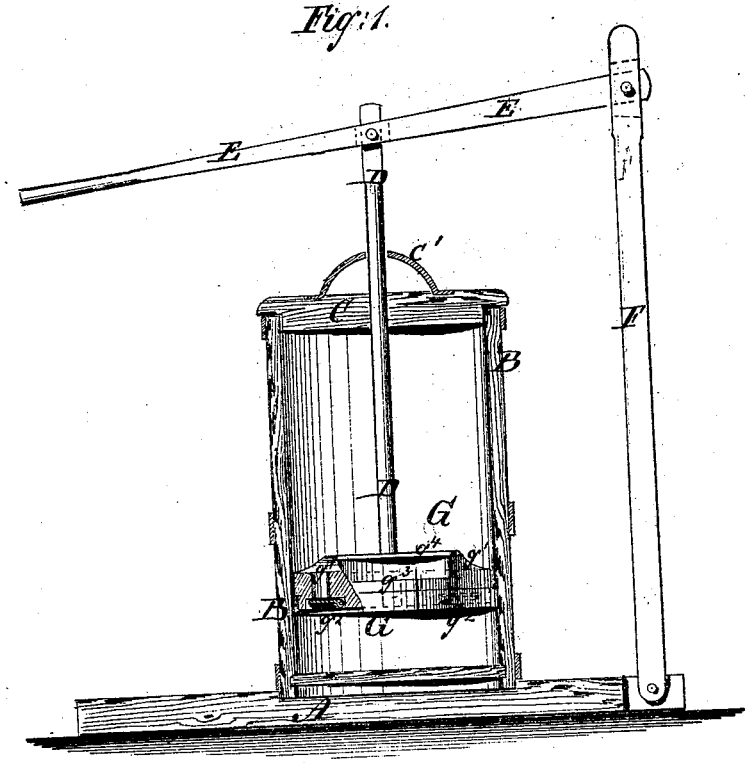
Figure 1 is a side view of my improved apparatus, partly in section, to show the construction.
Figure 2:
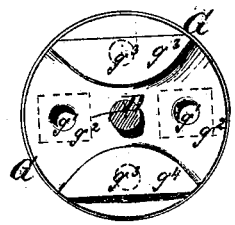
Figure 2 is a detail top view of the dasher.

The upper part of the dasher G, around the holes $g^3$, is cut away or recessed; and to said dasher are attached two small boards, $g^4$, projecting over said holes $g^3$, as shown in figs. 1 and 2.

If desired, the edge of the dasher G may have a leather cloth or other suitable packing attached to it, as shown in fig. 1, to prevent the passage of milk between the said edge of the said dasher and the inner surface of the churn B, and thus compel the milk to pass through the holes in said dasher.

By this construction, as the dasher G is moved upward, the pressure of the milk opens the valves $g^2$, and the milk is forced through the holes $g^1$ into the lower part of the churn.

As the dasher G is forced downward, the pressure of the milk closes the valves $g^2$, and the milk is forced to pass up through the holes $g^3$, and, striking against the boards, shelves, or ledges $g^4$, it is projected forcibly against the sides of the churn.

By this means, when the dasher is operated, the milk is thrown into violent agitation, bringing the butter in a very short time.

Having thus described my invention,

I claim as new and desire to secure by Letters Patent—

The piston-dasher G, fitting closely the churn-cylinder, and provided with valved apertures, which allow the milk to be forced through it alternately up and down, as shown and described.

NATHAN S. HAZEN.

Witnesses:
J. W. LANGDON,
GEO. F. TEN EYCK.